Jan. 15, 1952     B. DAILY     2,582,819
TANK SHUTOFF VALVE
Filed March 20, 1945
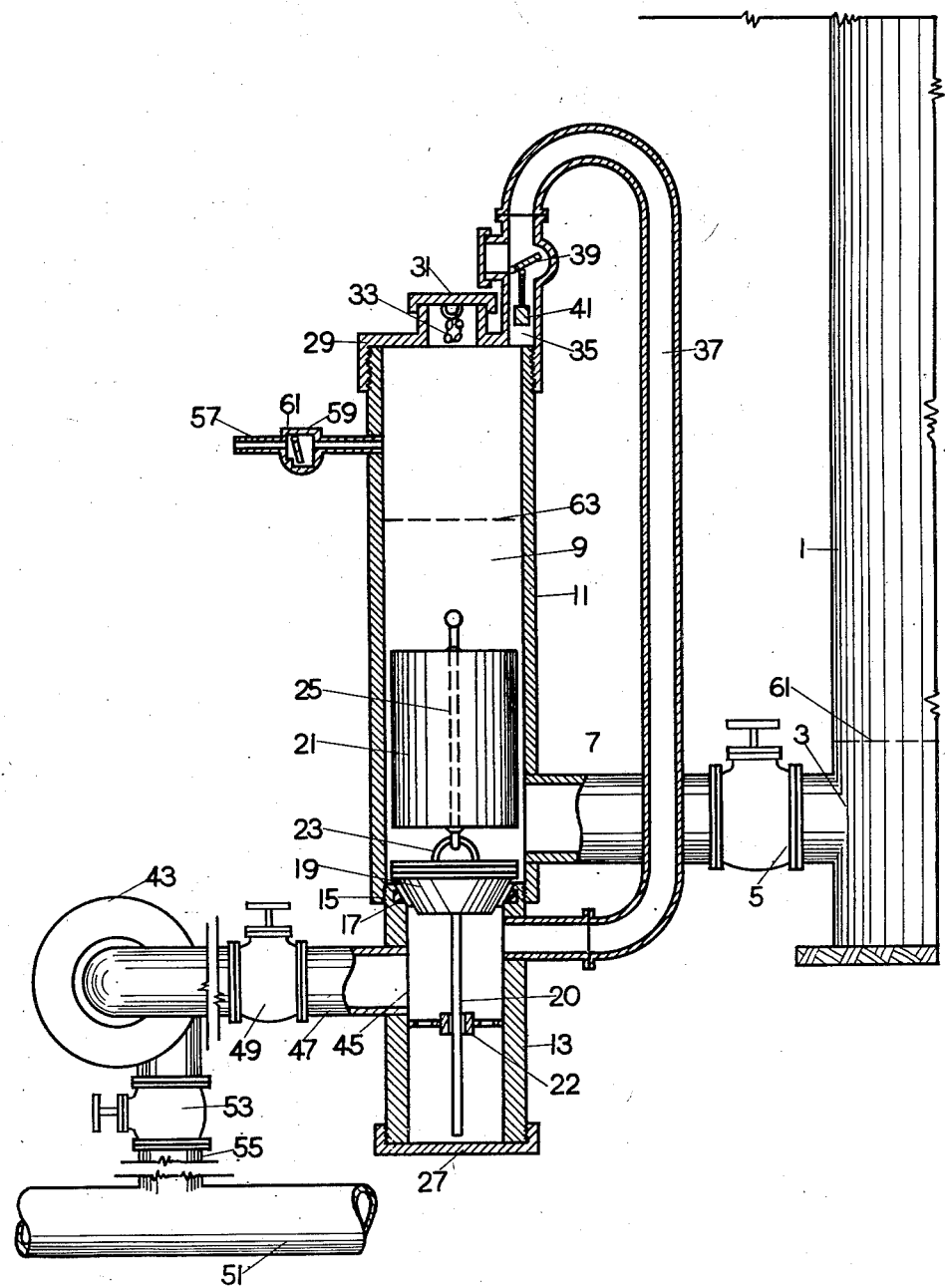
Inventor: Bernard Daily
By his Attorney:

UNITED STATES PATENT OFFICE 2,582,819

TANK SHUTOFF VALVE

Bernard Daily, Goose Creek, Tex., assignor to Shell Development Company, San Francisco, Calif., a corporation of Delaware Application March 20, 1945, Serial No. 583,682

3 Claims. (Cl. 137—68)

This invention relates to automatic shut-off valves used in systems devoted to the transportation of mineral oil or its liquid products.

In producing mineral oil from a well, it is customary to store the oil produced first in a lease tank or tanks located near the well, and then to convey said oil to the pipe-line gathering system, for example, by gravity or by periodically operating a suitable pump installation.

If in operating such system the oil is permitted to drain from the lease tank below a predetermined level, so that the tank outlet to the pipe line is open to the atmosphere, air and gas enter the line and produce a vapor lock in the line and any pumps which may be used for boosting the oil. This greatly decreases the efficiency of the pump or pumps, retards the flow of oil, and causes increased oxidation and corrosion in the pipe lines.

It is therefore the primary object of this invention to provide an automatic valve structure for shutting off the delivery line between a lease production tank or tanks and the pipe line means or gathering system when the oil level in said tank has been reduced to a predetermined level, such for example as one or two inches above the outlet orifice of the tank or tanks.

The valve structure of the present invention is especially applicable to gathering systems of the gravity or semi-gravity type. In the gravity type, the oil flows from the lease tanks to the pipe-line means, for example, to the initial station of the main pipe-line because of the higher elevation of the lease tanks. In the semi-gravity type, a pump is centrally located in the field at an elevation lower than the lease tanks. The liquid handled by this pump is supplied thereto from the lease tanks by gravity, and the pump boosts the pressure to that necessary to deliver the fluid to the initial station of the main pipe line. In both systems, a partial vacuum exists on the downstream side of a closed valve at or near the lease tanks. Because of this vacuum, a large force is usually necessary to open an automatic valve designed to prevent air from penetrating into the pipe line system. A still larger force is necessary to open this valve once it fails to open as soon as the liquid is admitted thereto from the tank, this increased force being required in view of the hydrostatic pressure exerted by the oil applied on top of said valve.

Although attempts have been made to overcome this difficulty by using large floats connected through suitable multiplying linkages to the valve body, the operation of such devices has been in general unsatisfactory. It is therefore a further object of this invention to provide a valve structure that will open automatically even though a negative or sub-atmospheric pressure prevails on the downstream side of the valve seat, while a positive hydrostatic pressure on the upstream side of said valve further tends to prevent said valve from opening.

Other objects of this invention will appear from the following description taken with reference to the attached drawing which shows diagrammatically and partly in cross-section an embodiment of the present automatic shut-off valve structure.

Referring to the drawing, a tank, such for example as a lease production tank 1, has its outlet 3 connected, through a valve 5 and conduit or pipe 7, to a standpipe 9 having an upper portion 11 and a lower portion 13 suitably connected as shown at 15, there being formed between said two portions a valve seat having, if desired, a suitable facing of packing material as shown at 17. Adapted to close downwardly against the valve seat 17 is a valve 19, which is supported from a float 21 by means of a flexible connection such as the links or rings 23, of which the lower is attached to the valve and the upper to the float, being affixed for example to a rod 25 passing through the hollow float and welded or brazed in fluid-tight manner to the upper and lower faces thereof. A flexible connection between the float and the valve is essential in order that the valve may seat properly without fail at any time when the float is lowered to a predetermined level within the standpipe by the receding fluid, rigid connections between float and valve having been found unsatisfactory as interfering with the proper seating of the valve. For proper centering, a rod 20, attached to the bottom of valve 19, may furthermore be guided by a spider 22 disposed within the lower portion of standpipe 9. The standpipe is closed at the bottom by a lid 27, and at the top by a cover 29, having a manhole 31 provided with a hook and chain attachment 33, on which the float and valve structure may be suspended when cleaning the system. The cover 29 is also provided with an orifice 35, whereby the upper portion of the standpipe is in communication with its lower portion below the valve seat 17 by means of a bypass conduit 37, provided at the top of the standpipe 1 with a check valve, such as a flap valve 39 operating about a horizontal axis and adapted to open upwards against the action of a weight 41 attached thereto, so that fluid flow is permitted within the conduit 37 only from the upper to the lower portion of the standpipe. The purpose of the weight 41, which may be varied to suit particular conditions of operation, is to prevent the check valve 39 from opening or chattering in response to a vacuum which may be applied thereto through conduit 37. It is of course understood that a loaded valve of any different type, such as a spring-loaded valve, may be used, if desired, instead of the valve shown at 39.

The intake of a pump 43 is in communication with the standpipe 1 through a conduit 47 provided with a valve 49, which conduit opens to the standpipe below the valve seat 17 as shown at 45. The discharge of the pump 43 is connected to a main or collecting pipe-line 51 through a pipe 55, provided with a valve 53. It is of course understood that in cases where tank 1 and standpipe 9 are located at a suitable level above the pipe-line 51, the pump 43 may be omitted, and the flow of fluid takes place from standpipe 9 to pipe line 51 through pipe 47 by gravity.

A vacuum breaker comprising a vent pipe 57 open to the atmosphere and provided with a check valve 59, opening inwardly about a horizontal axis, is installed in the upper portion of the standpipe above the valve seat 17.

The operation of the present automatic shut-off valve is as follows: Assuming that oil from a well, not shown, has been accumulating in the tank 1, the valve 5 being shut, it is desired to transport said oil to a relatively remote gathering pipe-line 51, whose elevation may be above or below that of tank 1. Upon the valve 5 being opened, the liquid from tank 1 fills the standpipe 9, submerging the float 21. However, due to the sub-atmospheric pressure usually prevailing at this time, as explained above, on the downstream side of the valve, and to the hydrostatic pressure which begins to build up on top of said valve as soon as the liquid is admitted to the stand-pipe, the float is unable to rise in said fluid and to open the valve, which thus remains closed.

Since the liquid level in tank 1 is at this moment considerably above the highest point of the standpipe structure, this liquid will, however, fill the standpipe and open the upper valve 39 against the action of the weight 41. It will then overflow through conduit 37 into the lower portion of the standpipe, thus equalizing pressures on both sides of valve 19, and will permit float 21 to lift said valve by buoyancy. Upon valve 49 being opened, and pump 43, in cases where this pump is used, being started in operation, the fluid from tank 1, or from a battery of such tanks having their outlet at substantially the same elevation, may be flowed or pumped to the gathering pipe-line 51.

As the fluid is flowed or pumped out of tank 1, and its level, both within the tank 1 and the standpipe 9 which is in hydrostatic communication therewith through the conduit 7, recedes to a predetermined level selected to come one or a few inches above the outlet from said tank, as shown at 61 in the drawing, the valve 19 is seated and stops further withdrawal of liquid from the tank, thus preventing air or gas from getting into the pump and pipe-line system.

The valve 59 is essential to the operation of the present system to break the vacuum which is created in the upper portion of the standpipe 9 as the liquid in both tank 1 and standpipe 9 recedes to a level lower than the top of the standpipe but above the low level 61. This vacuum would maintain the liquid in the standpipe at some such level as shown at 63, thereby preventing valve 19 from closing, whereas the liquid in tank 1, which is normally open or vented at the top, would drain to a level below that shown at 61, thus admitting air to the system through connection 3. To prevent this, check valve 59 operates to admit air to the space in the standpipe above the liquid therein when a partial vacuum obtains in said space, thus permitting the liquid in the standpipe and the float supported thereby to travel downwards at the same rate and level as the liquid in the tank 1.

I claim as my invention:

1. An automatic shut-off valve structure for a system comprising a tank and pipe-line means for exhausting fluid from said tank, said structure comprising a closed vertical standpipe, said standpipe having inlet means in communication with said tank, and outlet means in communication with said pipe-line means, a valve seat within said standpipe interposed between said inlet and said outlet means, a float valve adapted to close with said seat when the fluid in said standpipe reaches a predetermined level a conduit in by-pass communication between portions of said standpipe upstream and downstream of said valve seat, check valve means in said by-pass conduit, and loading means for said check valve means, said loading means being selected of a value such as to permit said check valve means to be opened by the pressure of fluid overflow rising in said upstream portion of the standpipe, and to maintain said check valve means closed against any vacuum which ordinarily may be applied thereto through said by-pass conduit from the said downstream portion of the standpipe.

2. An automatic shut-off valve structure for a system comprising a tank and pipe-line means for exhausting fluid from said tank, said structure comprising a vertical standpipe closed at both ends, a conduit in communication between said standpipe and the tank, a second conduit in communication between said standpipe and said pipe-line means, said second conduit opening to said standpipe at a point lower than said first conduit, a valve seat within said standpipe intermediate the openings thereto of said two conduits, a float valve adapted to seat thereon when the fluid in said standpipe reaches a predetermined level a conduit in by-pass communication between portions of said standpipe upstream and downstream of said valve seat, check valve means in said by-pass conduit, and loading means for said check valve means, said loading means being selected of a value such as to permit said check valve means to be opened by the pressure of fluid overflow rising in said upstream portion of the standpipe, and to maintain said check valve means closed against any vacuum which ordinarily may be applied thereto through said by-pass conduit from the said downstream portion of the standpipe.

3. An automatic shut-off valve structure for a system comprising a tank and pipe-line means for exhausting fluid from said tank, said structure comprising a vertical standpipe closed at both ends, a valve seat within said standpipe separating said standpipe into an upper and a lower portion, a valve adapted to close downwardly with said seat, a float adapted for vertical displacement within the upper portion of said standpipe, flexible link means connecting said float to said valve, a conduit in communication between the tank and the upper portion of said standpipe, a second conduit in communication between said pipe-line means and the lower portion of said standpipe a conduit in by-pass communication between the upper and the lower portion of said standpipe, check valve means in said conduit, and loading means for said check valve means, said loading means being selected of a value such as to permit said check valve means to be opened by the pressure of fluid overflow rising in said upstream portion of the standpipe, and to maintain said check valve means closed against any vacuum which ordinarily may be applied thereto through said by-pass conduit from the lower portion of the standpipe.

BERNARD DAILY.

REFERENCES CITED

The following references are of record in the file of this patent:

UNITED STATES PATENTS

| Number | Name | Date |
|---|---|---|
| 669,611 | Anderson et al. | Mar. 12, 1901 |
| 690,986 | Neely | Jan. 14, 1902 |
| 880,761 | Smith et al. | Mar. 3, 1908 |
| 1,016,573 | Maddox | Feb. 6, 1912 |
| 1,247,812 | Fritz | Nov. 27, 1917 |
| 1,268,917 | Blackstone | June 11, 1918 |
| 1,542,036 | Conrader | June 16, 1925 |
| 1,548,298 | Woodard | Aug. 4, 1925 |
| 1,746,785 | Lindsey | Feb. 11, 1930 |
| 1,845,129 | Coahran | Feb. 16, 1932 |
| 2,045,909 | Haralson | June 30, 1936 |
| 2,089,741 | Gaines | Aug. 10, 1937 |
| 2,130,335 | Barker | Sept. 20, 1938 |
| 2,169,561 | Layne | Aug. 15, 1939 |